[11] 3,571,631

[72] Inventor Norman A. Evans
 Wayne, Pa.
[21] Appl. No. 678,859
[22] Filed Oct. 30, 1967
[45] Patented Mar. 23, 1971
[73] Assignee General Electric Company

[54] ELECTRICAL DISCHARGE STABILIZER
 10 Claims, 4 Drawing Figs.
[52] U.S. Cl. .................................................. 310/11
[51] Int. Cl. ................................................. H02n 4/02
[50] Field of Search ........................................ 310/11;
 313/161; 315/111; 13/9, 18, 31 (Cursory);
 219/121, 121 (P)(Inquired); 60/202; 317/3

[56] References Cited
 UNITED STATES PATENTS
2,305,500 12/1942 Slayter ........................ 230/69
3,229,156 1/1966 Reid, Jr. ...................... 315/111
3,400,513 9/1968 Boll ............................. 310/10

*Primary Examiner*—David X. Sliney
*Attorneys*—Paul F. Prestia, Allen E. Amgott, Henry W. Kaufmann, Melvin M. Goldenberg, Frank L. Neuhauser and Oscar B. Waddell ABSTRACT: An electrical discharge between electrodes on opposite sides of a high velocity gas stream tends, due primarily to gas dynamic effects, to be unstable and inefficient. An electrically nonconductive member, called a discharge holder, extended between the discharge electrodes tends to stabilize the discharge by allowing it to concentrate in the low velocity wake region downstream of said holder. Externally applied DC induced discharges, stabilized by such holders, in the entrance region of a nonequilibrium MHD generator have resulted in steady state power generation in such devices downstream of the entrance region.

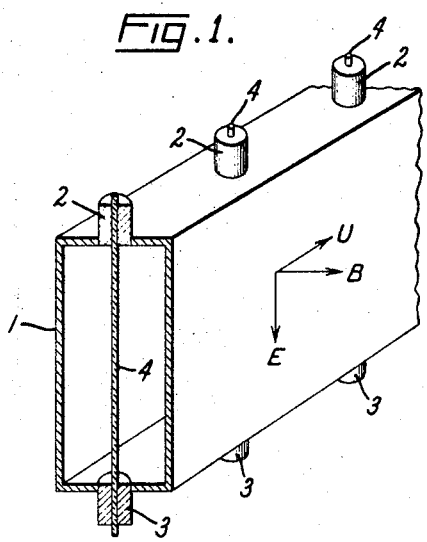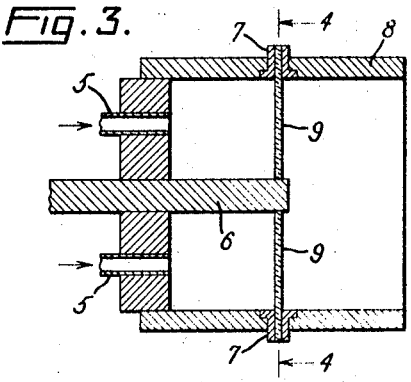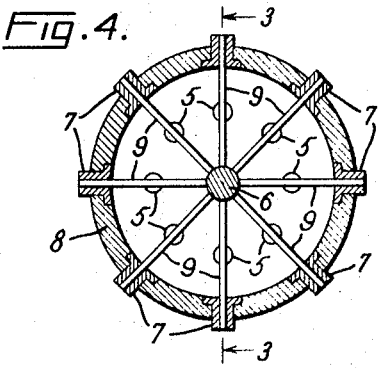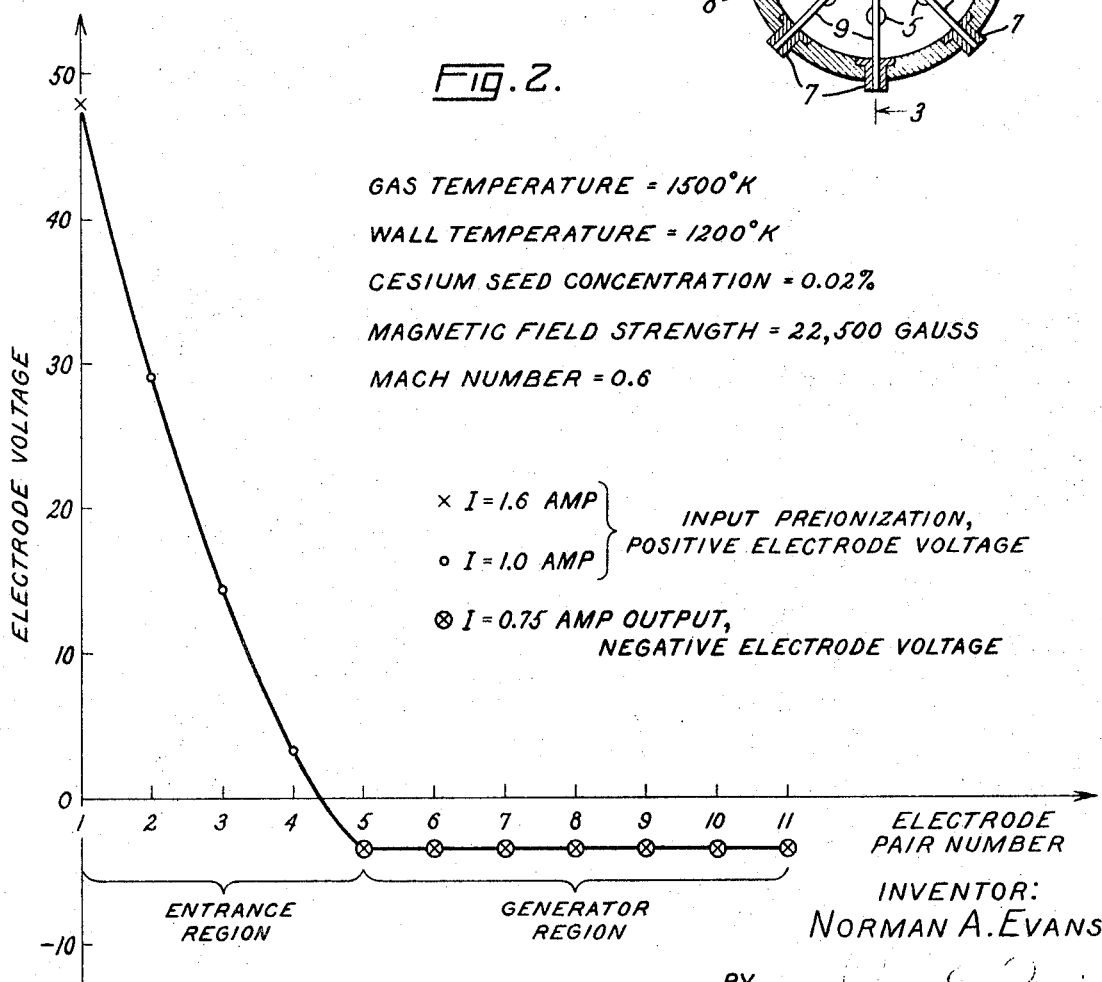

ELECTRICAL DISCHARGE STABILIZER

This invention relates to means for stabilizing and rendering more efficient a discharge between electrodes disposed on opposite sides of a high velocity stream of gas. More particularly the invention pertains to means for stabilizing electrical discharges in the entrance region of a nonequilibrium magnetohydrodynamic generator.

BACKGROUND OF THE INVENTION

Extraction of electrical energy from an electrical field set up by the movement of a conductive gas through a magnetic field is a well-known process. Generators of this type, usually referred to as magnetohydrodynamic (MHD) generators, having previously been disclosed by, inter alia, Rudenberg in U.S. Pat. No. 1,717,413.

In one type of such a MHD generator, the working gas is rendered conductive by using a high temperature to produce sufficient thermal ionization of the gas. This temperature may be on the order of 3,600° K. To withstand exposure to this hot gas, the other components of such generators must be extraordinarily resistant to high temperature degradation.

Efforts have been made to develop a MHD generator based on a working gas rendered conductive at lower temperatures by using the phenomenon of nonequilibrium ionization so that a nuclear reactor could be used as the energy source. Magnetically induced fields and electrical discharges produced by the application of electrical potentials are two of the more commonly suggested means to render the working gas in a nonequilibrium MHD generator conductive. While the former has been demonstrated in very short operational periods using shock wave generated high velocity gas streams, continuous or sustained generation of electrical power in a nonequilibrium MHD generator has not heretofore been attained in any known system.

One of the difficulties in the type of nonequilibrium MHD generator in which an electrical discharge is used to render the working gas conductive is that a discharge in a high velocity gas stream tends to be unstable, due primarily to gas dynamic effects. As a result, an excessive amount of energy is dissipated in forming and maintaining the discharge. It should be noted that this problem is not limited to nonequilibrium MHD generators however. For example, arc discharge heaters and plasma generators are two other types of devices in which discharges across high velocity gas streams occur. In these applications also, instabilities in the discharges and dissipation of undue amounts of energy may be a problem.

It is therefore an object of the present invention to reduce the energy dissipated in an electrical discharge between electrodes on opposite sides of a high velocity gas stream.

Another object of this invention is to provide a means for establishing a stable discharge across a conduit carrying a high velocity stream of gas.

A further object of this invention is to provide a means for facilitating the steady state generation of electrical power in a nonequilibrium generator.

BRIEF SUMMARY OF THE INVENTION

These and other objects are met, in accordance with the present invention, by a small diameter electrically nonconductive bridge member extending from one electrode across a high velocity gas stream to a counter electrode. Any discharge between the electrode and the counter electrode will thereby be concentrated in the low velocity wake region on the downstream side of the nonconductive member. In the preferred from of the present invention a series of several electrode pairs with ceramic bridge members, connected to DC energy sources to produce electrical discharges, are placed in the entrance region of a nonequilibrium MHD generator in which the working gas is an alkali metal seeded noble gas at 1,000—2,000°K flowing at a velocity in excess of Mach 0.5. Argon, xenon and helium are typical of the noble gases used in the present invention.

DETAILED DESCRIPTION OF THE INVENTION

While the specification concludes with claims particularly pointing out and distinctly claiming the subject matter of the present invention, this invention may be better understood from the following description, taken in conjunction with the following drawings, in which:

FIG. 1 is an isometric cross-sectional view of an MHD channel in which the present invention has been incorporated;

FIG. 2 is a graph showing the electrode potential at several electrode positions, including both the entrance region and the generation region of a nonequilibrium MHD generator utilizing a channel such as that shown in FIG. 1;

FIG. 3 is a cross-sectional side view of an arc discharge heater in which the present invention can be used; and FIG. 4 is a front cross-sectional view of the arc discharge heater shown in FIG. 3.

Referring specifically to FIG. 1, there is shown a rectangular cross section linear channel 1 with several anode electrodes 2 on one sidewall thereof and paired cathode electrodes 3 disposed on the opposite sidewall. An electrically nonconductive rodlike, bridge member 4, generally a ceramic material such as alumina, extends from each of the electrodes 2 to the paired counter electrode on the opposite wall of channel 1. Generally, members 4 are designed to present a relatively small cross section to the gas flowing around them.

While sustained generation of electrical power in a nonequilibrium MHD generator has not heretofore been achieved, it has now been found in accordance with the present invention that sustained power generation in such devices is possible. In the MHD devices to which the present invention is applicable, the conductivity of the working gas is enhanced by an externally applied DC potential producing an electrical discharge across the gas stream at several electrode positions in the entrance region of the MHD channel. In particular it has been found that such discharges, while heretofore dissipative of excessive energy and therefore generally ineffective in contributing to power generation, can be stabilized and rendered substantially more efficient by the inclusion of electrically nonconductive bridge members in the vicinity of the discharges. These bridge member may also be referred to as discharge holders because of the tendency of the discharges to be stabilized and concentrated in the low velocity wake region downstream of the bridge members.

This characteristic has been demonstrated in a cesium seeded argon stream at 1,200° K and Mach 0.5, in which the steady state ideal voltage necessary to maintain a 5 amp discharge was about 20 volts. Actually, a 5 amp discharge was found to be maintained by an unsteady 100—120 volts without a discharge holder and by a steady 30 volts with a discharge holder. Thus the voltage loss was reduced by a factor of one-tenth from 100 volts to 10 volts and this reduction was directly attributable to the inclusion of a discharge holder in the stream. The improved stability of the discharge produced with a discharge holder as compared to those produced without benefit of the discharge holder of the present invention was also visually observable.

The effect of such discharge stabilizing members in a plasma preparation of preionization region of a nonequilibrium MHD generator has been demonstrated in a number of experiments, using a rectangular channel similar to that shown in FIG. 1. In this device, 0.16 centimeter diameter alumina bridge members were mounted between 11 pairs of flush mounted 1.0 centimeter diameter molybdenum electrodes disposed at 2.0 centimeter intervals along the length of the channel. This channel was 5 centimeters high and varied in width from 1.25 centimeters at its entrance end to 1.75 centimeters at its exit end. A magnetic field of 22,500 gauss was imposed on the channel in the direction indicated by vector B in FIG. 1. Argon at 1,500° K containing 0.02 mol percent cesium was introduced into the channel in the direction indicated by the vector U in FIG. 1 at a steady stream velocity of Mach 0.6. Independent DC power sources were connected to each of the first four electrode pairs with a polarity, as indicated by field vector E in FIG. 1, corresponding to that induced by the movement of conductive gas through the magnetic field in the channel. A wire and current controlling means such as a rheostat, connected the two electrodes in each electrode pair so that a constant current could be maintained through each of the electrode pairs. The channel walls were preheated to 1,200° K.

The measured voltage at each of the 11 electrode pair positions, is plotted in FIG. 2. As seen in FIG. 2, positive voltage was observed at each of the first four electrode positions. This indicates that electrical discharges were produced at each of these electrode pair positions by the externally applied DC potential. In the remaining seven electrode pairs a steady negative voltage was attained indicating power output was attained in this region. Steady state negative voltage was maintained for several minutes to demonstrate that sustained operation was possible. Only the gas supply used in the experiments prevented longer periods of operation. These experiments indicate that while the stabilized electrical discharge is necessary in the entrance region of the device to render the gas sufficiently conductive to produce electrical energy, the electrical field induced by the applied magnetic field is sufficient to maintain the conductivity of the gas beyond the entrance region in what may be termed the power generation region. Since the voltage and current are constant in each of the last seven electrode pairs which constitute the power generation region, it appears that the power output can be increased merely by adding channel length and electrode pairs. Further there appears to be no limitation on the period for which such a generator may be operated. The feasibility of sustained power generation in a nonequilibrium MHD system has therefore been demonstrated.

While the present invention is of most direct interest in regard to nonequilibrium MHD generators, it is likely to be of value also in any other application in which an electrical discharge, either arc or glow, occurs across a high velocity gas stream. For example referring now to FIGS. 3 and 4, there is shown an arc discharge heater or plasma generator in which gas entering the device at high velocity through inlets 5 is either heated or ionized by discharges between the centrally disposed electrode 6 and a plurality of circumferentially disposed electrodes 7 in the enclosure 8 of the device. Ceramic members 9 extending from central electrode 6 radially to electrodes 7 are used to stabilize and concentrate the power of the discharges in the low velocity wake regions downstream of members 9. The efficiency of the device is thereby improved by reducing the energy lost due to discharge instabilities attributable to gas dynamic effects. In view of the high heat concentration in apparatus such as that shown in FIGS. 3 and 4 tubular ceramic material may be used for members 9 so that a cooling fluid may be circulated through these members during operation.

While the present invention has been described with reference to particular embodiments thereof for purposes of clarity and convenience, it should be understood that numerous modifications may be made by those skilled in the art without departing from the invention's true spirit and scope. Therefore the appended claims are intended to cover all such equivalent variations as come within the true spirit and scope of the present invention.

I claim:

1. A device for steady state generation of electrical power comprising:
    a. a channel;
    b. a plurality of electrodes linearly disposed along one inner surface of said channel, each paired with and electrically connected to a complementary electrode disposed across said channel on an opposing inner surface of said channel;
    c. means for producing a high velocity stream of gas through said channel;
    d. means for producing a magnetic field transverse both to said channel and to any electric field which may be established between said paired electrodes; and
    e. means for enhancing the conductivity of said gas said means comprising DC energy sources connected to at least one of the pairs of electrodes near the entrance of said channel and, bridging the gap between opposed electrodes of said pairs, discharge holders comprising small diameter, electrically nonconductive members extending from each electrode of said pairs, across the channel, to the opposed, paired electrode.

2. A device, such as that recited in claim 1, wherein said gas comprises a noble gas at 1,000—2,000 ° K.

3. A device, such as that recited in claim 1, wherein said gas comprises a noble gas at 1,000—2,000°K containing a small proportion of alkali metal vapor.

4. A device, such as that recited in claim 1, further including means to regulate the current passing through said pairs of electrodes.

5. A device, such as that recited in claim 1, wherein said gas stream has a velocity above Mach 0.2.

6. A device, such as that recited in claim 1, wherein said gas stream has a velocity above Mach 0.5.

7. In an apparatus including means for subjecting a high velocity gas stream to an electrical discharge, said means comprising at least one pair of discharge electrodes disposed transverse of said stream and means for causing an electrical discharge between said pairs of discharge electrodes, the improvement comprising a nonconductive discharge holder extending from one of said discharge electrodes, across said stream, to the other of said discharge electrodes.

8. Improved apparatus, as recited in claim 7, wherein said nonconductive discharge holder comprises a tubular ceramic member.

9. Improved apparatus, as recited in claim 7, wherein a plurality of ceramic members extend radially outward from a central electrode to circumferentially disposed counter electrodes.

10. Improved apparatus, as recited in claim 7, wherein said gas stream has a velocity above Mach 0.2.